Sept. 24, 1946.    C. G. VOKES ET AL    2,408,130
FILTER CLEANING MECHANISM
Filed Sept. 1, 1943    2 Sheets-Sheet 1

Inventors
Cecil G. Vokes
Edward A. Stokes
By
Attorney

Sept. 24, 1946.   C. G. VOKES ET AL   2,408,130
FILTER CLEANING MECHANISM
Filed Sept. 1, 1943   2 Sheets-Sheet 2
FIG.2.
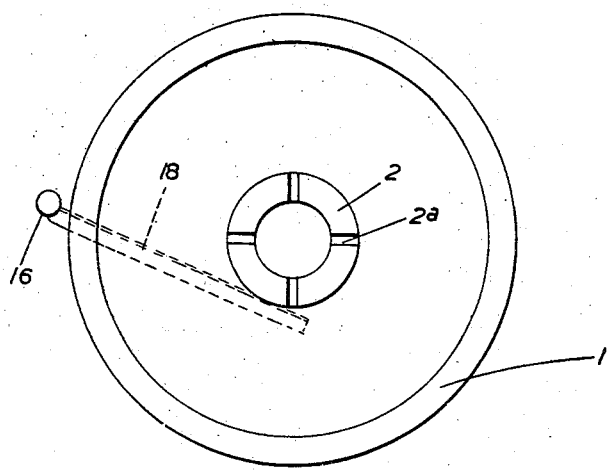
FIG.3.
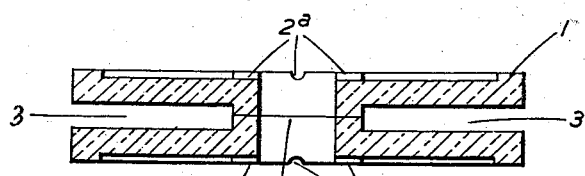
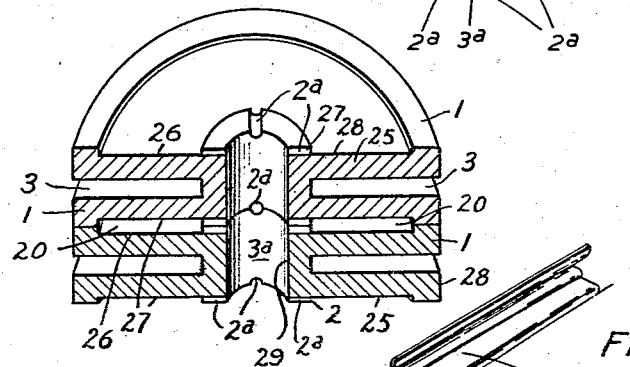
FIG.5
FIG.4
Cecil G. Vokes
Edward A. Stokes   Inventors
By
Attorney Patented Sept. 24, 1946

2,408,130

UNITED STATES PATENT OFFICE 2,408,130

FILTER CLEANING MECHANISM

Cecil Gordon Vokes and Edward Arthur Stokes, London, England; said Stokes assignor to Vokes Limited, London, England Application September 1, 1943, Serial No. 500,872
In Great Britain September 17, 1942

6 Claims. (Cl. 210—116)

Filters in which a considerable surface area of a filtering material is contained in a relatively small volume are commonly employed. There are, for example, well known forms of filter with deeply corrugated or grooved or pleated screens, often of porous textile materials suitably mounted and possibly of star-shaped cross section or of concertina form.

The present invention provides a construction in which discs of rigid (as opposed to definitely flexible) porous materials are assembled to produce a filter unit having hollow fins with deep spaces between them. Such a construction can utilize effectively porous ceramic or like materials, giving easy replacement and the possibility of surface scraping when the pores become clogged. Moreover any suitable number of discs can be assembled together to give filter packs of varying capacities.

It is preferred to use annular unglazed ceramic discs with a central opening to be superimposed in alignment. Each disc, which is of appreciable thickness, is formed to provide an outer peripheral edge or surface and an inner peripheral edge or surface. The outer and inner surfaces of the disc as said disc is positioned in filter assembly, are each formed, in line with the outer and inner peripheral edges, with ribs extending from such upper and lower surfaces and for a short distance from the inner and outer peripheral edges. The ribs at the outer peripheral surface are of slightly greater thickness beyond the upper and lower surfaces of the disc than the ribs at the inner peripheral surface. The outer peripheral surface of each disc is formed between the upper and lower surfaces of that disc with a groove or channel extending completely around the disc, opening at its one end through the outer peripheral surface but not extending to the inner peripheral surface. The ribs on the upper and lower surfaces at the outer peripheral edge of the discs contact with each other when the discs are in filter service positions, and thus separate the upper and lower surfaces of each disk from that of the adjacent discs to thus define what may be termed as inner channels between the discs. Each of such inner channels are thus closed adjacent the outer peripheral surfaces of the disc by the contacting outer ribs. The inner ribs, either by reason of their adjacent edges being spaced by forming such inner ribs of less height than the outer ribs, or by channelling or buttressing such inner ribs, afford an opening leading from an inner channel through the inner peripheral edges of the disc.

The above and other parts of the invention are embodied in a typical example which will now be described with reference to the accompanying drawings as applied to an oil filter of porous ceramic material. The parts of the invention for which a monopoly is desired are those set out in the claims.

In the drawings:

Fig. 2 is a plan view of a disc of porous ceramic material, showing also how the cleaning knife is arranged, Fig. 3 is a sectional elevation of the disc in slightly modified form, Fig. 4 is a perspective view of one of the cleaning knives, Fig. 5 is a broken perspective view partly in section showing two discs of the preferred form in superimposed filter forming relation.

Figure 1:
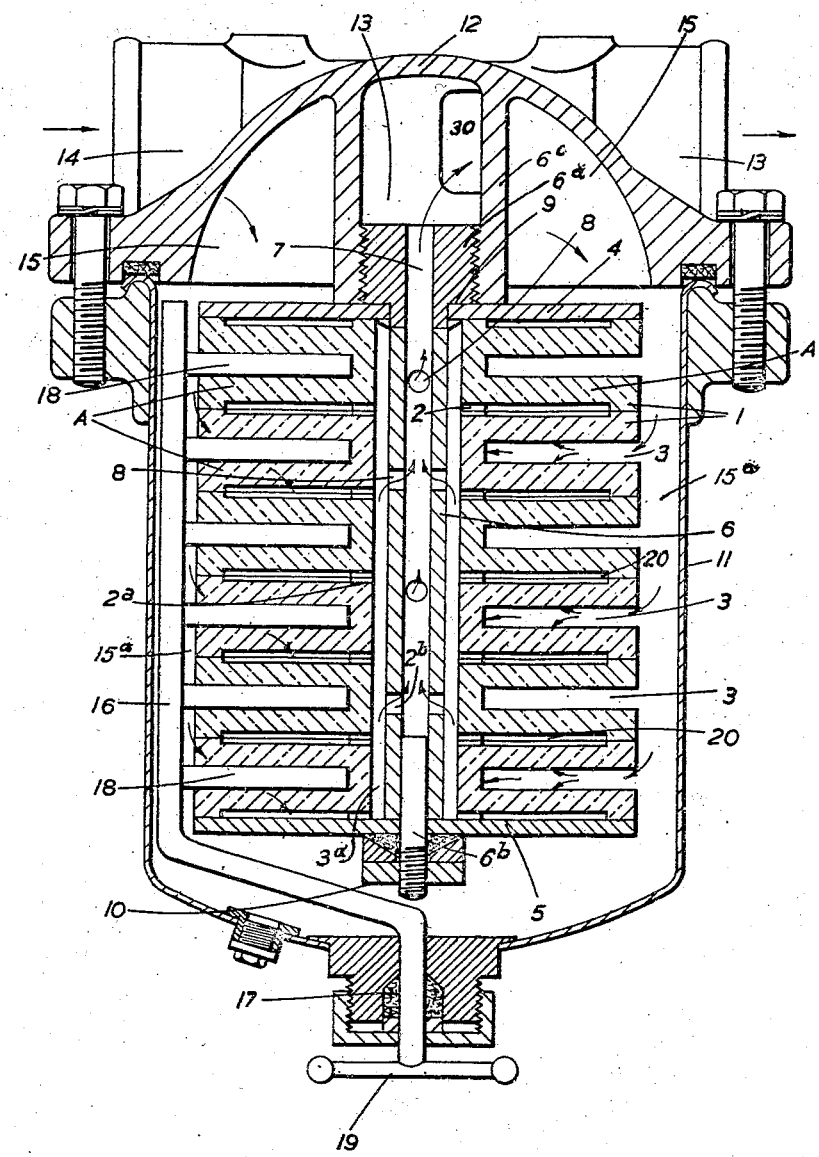
Fig. 1 is a sectional elevation.

The improved filter is made up of a plurality of annular discs 25 of unglazed porous ceramic material arranged in superimposed contact in axial alignment. Each disc is formed on its opposing upper and lower faces 26 and 27 with annular abutment ribs 1 at the outer margin of such faces and annular abutment ribs 2 at the inner margin. Each disc in the form shown in Figs. 1 and 2 is formed with an annular channel 3 opening through the outer peripheral surface 28 of the disc and terminating short of the inner peripheral surface 29. The discs are each formed with a central axial opening which when the discs are assembled, provides a central bore 3a extending vertically of the superimposed discs and defined by the inner peripheral surfaces 29. The discs are held in assembled relation between upper and lower plates 4 and 5 and the discs are held by the plates to receive in the central bore a tubular element 6 having an exterior diameter less than that of the bore. The upper end of the tube 6 is provided with an enlargement 6a having a bore in alignment with the bore of the tube and exteriorly threaded to engage an annular wall 6c which communicates with the outlet 13 of the filter. The enlargement 6a and tube 6 may be made as a single element or as indicated in Fig. 1, welded to each other and to the upper plate 4. The lower end of the tube 6 rests squarely on the lower plate 5 and is provided with a threaded pin 6b, preferably welded or otherwise secured in the tube and passing through the plate 5 and secured by a nut 10 to provide a rigid filtering assembly which, however, may be easily disconnected for change of discs at will.

The annular channel 3 in each disc provides a large material entrance area for filtration purposes while the annular ribs 1 and 2 provide between the discs, an elongated relatively narrower channel or hollow 20 by which the material filtered through the discs is delivered through openings 2a, Fig. 5, to the bore 3a of the assembled discs and from the bore through openings 2b in the wall of the tube 6 and upwardly through the bore of the tube to the outlet 30.

The inlet 14 of the conventional header delivers the oil to a space 15 surrounding the wall 6c and from the space 15 to an annular space 15a between the periphery of the disc assembly and a casing 11, or as clearly shown in Fig. 1. A cranked member 16 passing through a suitable gland or packing 17 at the end of the casing carries cleaning or scraping blades 18 (preferably of springy metal) extending into the spaces 3 between the hollow fins. The cleaning blades 18 may be welded or otherwise conventionally secured to the member 16, or, if preferred and as shown in Fig. 4, the member may be provided with lateral rods 19' with which the cleaning blades are connected. By rotating an external handle or knob 19 the blades can thus be caused to throw out the sludge from between the layers of filtering medium and also to scrape the outer surface of the filtering material and preferably remove a small clogged layer and expose a new surface.

Obviously as clearly shown in Fig. 3, the discs need not necessarily be made in one integral piece; other assemblies of discs or various forms to give the hollow finned construction with the fins extending either outwardly or inwardly can be devised without difficulty within the underlying ideas of the invention, and the filter can be used for various fluids.

Where the discs are made in two parts the plane of separation will preferably be as indicated by the line 3a, Fig. 3 whereby the upper and lower halves are identical and, when positioned reversed upon one another, as shown, coact to form the groove or annular channel 3.

We claim:

1. A filter made up of a plurality of independent elements assembled in superimposed relation, each element being of rigid porous material in annular form with a central bore, the meeting faces of the elements being each formed with abutments adjacent its inner and outer margins, the abutments at the outer margins of adjacent elements continuously contacting to form a closed space of material area between abutting faces of the elements at one end, the abutments at the inner margins of the elements being transversely apertured to provide communication between said space and the central bores of the elements, the outer margin of each element between the faces thereof being formed with an annular recess providing an entrance channel for fluid.

2. A filter unit including a series of superimposed annular discs of rigid, porous material, each disc having a central bore with all bores aligned in a series of discs, the meeting faces of the discs being formed with abutments adjacent their inner and outer peripheries, the abutments at the inner peripheries of the discs being formed to provide free communication between the central opening formed by the assembled discs and spaces between the discs defined by contacting abutments at the outer peripheries of the discs, each disc being formed with an annular recess providing a channel opening through the outer side wall of the disc to provide entrance areas for the fluid to be filtered, and means arranged in the central opening of the assembled discs for connecting said discs in assembled stacked relation and for receiving fluid delivered to that opening for discharge.

3. A filter unit made up of a series of independent discs, supported in relatively superimposed relation, each disc having an inner peripheral surface defining a central opening, each disc having an outer peripheral surface defining an annular outer margin with the said outer margin formed with an annular channel defining a filter entrance channel with the said channel extending through the outer peripheral surface of the disc, toward, but not through, the outer peripheral surface of the disc, each disc being formed in its upper and lower surfaces with elements providing axially extending ribs adjacent the outer periphery of each disc and further formed with additional axially extending ribs on said upper and lower surfaces adjacent the inner periphery of each disc, with such additional ribs having radially extending channels therethrough to afford communication with said central opening and the annular space between said ribs, the ribs at the outer margins of the superimposed discs abutting when the discs are assembled, to provide a seal at one end of an inner channel formed between approximate faces of adjacent superimposed discs when discs are assembled, means to direct a fluid to be filtered, to the entrance channels whereby the fluid is directed from the entrance through the body of the discs and into the inner channels between adjacent discs and to the central openings of the discs when assembled, and means extending longitudinally of the central opening of the discs to receive the fluid directed into said central opening from the discs and to direct the same outwardly beyond the discs for discharge.

4. A construction as defined in claim 3 wherein the inner margin of the discs forms a receiving bore for the filtered material, and wherein said means extending longitudinally of said central opening comprises a tube open to said bore for discharging the filtered material to an outlet.

5. A construction as defined in claim 3 wherein scraping elements are mounted in the entrance channels of the discs, and wherein means are provided exterior of the disc assembly for moving said scrapers throughout the respective channels for cleaning the same.

6. A construction as defined in claim 3 wherein the entrance channel of each disc is provided with a spring scraping blade and an operating member connecting all such blades for simultaneous scraping operation in the channels for cleaning purposes.

CECIL GORDON VOKES.
EDWARD ARTHUR STOKES.